United States Patent
Noda et al.

(10) Patent No.: US 11,843,136 B2
(45) Date of Patent: Dec. 12, 2023

(54) FUEL CELL SEPARATOR AND METHOD OF MANUFACTURING FUEL CELL SEPARATOR

(71) Applicant: HONDA MOTOR CO., LTD., Tokyo (JP)

(72) Inventors: Akihiro Noda, Saitama (JP); Katsunori Saiki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/452,231

(22) Filed: Oct. 25, 2021

(65) Prior Publication Data
US 2022/0140358 A1    May 5, 2022

(30) Foreign Application Priority Data

Oct. 30, 2020   (JP) .................................. 2020-183268

(51) Int. Cl.
*H01M 8/0228*    (2016.01)
*H01M 8/0221*    (2016.01)
*H01M 8/0213*    (2016.01)
*H01M 8/021*     (2016.01)

(52) U.S. Cl.
CPC ......... *H01M 8/0228* (2013.01); *H01M 8/021* (2013.01); *H01M 8/0213* (2013.01); *H01M 8/0221* (2013.01)

(58) Field of Classification Search
CPC .. H01M 8/021; H01M 8/0213; H01M 8/0221; H01M 8/0228
See application file for complete search history.

(56) References Cited

U.S. PATENT DOCUMENTS

2011/0229791 A1    9/2011   Kageyama et al.
2016/0156053 A1*   6/2016   Horai ................... H01M 4/8605
                                                         429/480

FOREIGN PATENT DOCUMENTS

| JP | 2001093538 A | 4/2001 |
| JP | 2005268150 A | 9/2005 |
| JP | 2012110377 A | 6/2012 |
| JP | 2012224892 A | 11/2012 |
| WO | 2010061711 A1 | 6/2010 |

OTHER PUBLICATIONS

Notification of Reasons for Refusal issued in the JP Patent Application No. 2020-183268, dated Aug. 1, 2023.

* cited by examiner

*Primary Examiner* — Jane J Rhee
(74) *Attorney, Agent, or Firm* — CKC & Partners Co., LLC

(57) ABSTRACT

The present invention is directed to a fuel cell separator 1 included in a fuel cell, and the fuel cell separator 1 includes: a substrate 11 made of stainless steel; a middle portion 30 including a power generating portion; and an outer peripheral portion 20 including a non-power generating portion. The middle portion 30 includes a dissimilar metal layer 12 different from the stainless steel included in the substrate on the substrate, and a carbon layer 13 provided on the dissimilar metal layer 12, and the outer peripheral portion 20 includes a portion including the dissimilar metal layer 12, the carbon layer 13, and a resin layer 14 on the carbon layer, and a portion not including the dissimilar metal layer 12 or the carbon layer 13, and including the resin layer 14 on the substrate.

5 Claims, 2 Drawing Sheets

FUEL CELL SEPARATOR AND METHOD OF MANUFACTURING FUEL CELL SEPARATOR

This application is based on and claims the benefit of priority from Japanese Patent Application No. 2020-183263, filed on 30 Oct. 2020, the content of which is incorporated herein by reference.

BACKGROUND OF THE INVENTION

Field of the Invention

The present invention relates to a fuel cell separator and a method of manufacturing the fuel cell separator.

Related Art

It has been conventionally known that, in a solid polymer electrolyte fuel cell, an air electrode and a hydrogen electrode are bonded to the respective sides of a solid polymer electrolyte membrane, and separators or bipolar plates are respectively opposed to the air electrode and the hydrogen electrode (see, for example, Japanese Unexamined Patent Application, Publication No. 2001-93538). The air electrode side through which oxygen or air passes becomes an acidic atmosphere having an acidity of pH 2 to pH 3. Therefore, the separators are each subjected to surface treatment for corrosion protection on the surface of a metal plate serving as a substrate such as a stainless steel plate. More specifically, an acid-resistant film selected from Ta, Zt, Nb, Ti, and Ni—Cr alloy is formed on the surface of the stainless steel plate, and a conductive film selected from Au, Pt, and Pd is further formed on the acid-resistant film.

Patent Document. 1: Japanese Unexamined Patent Application, Publication No. 2001-53533

SUMMARY OF THE INVENTION

In the manufacturing process of the conventional separator described in Japanese Unexamined Patent Application, Publication No. 2001-93538, the acid-resistant film is formed on the surface of a metal plate serving as a substrate of a stainless steel plate or the like by a PVD method or the like, following which the conductive film is further formed by a PVD method or the like. This process is performed on both the front and back surfaces of the stainless steel sheet. In other words, it is necessary to perform this process of forming the acid-resistant film and forming the conductive film on one separator. Therefore, higher efficiency of the manufacturing process has been demanded.

An exemplary embodiment of the present invention provides a fuel cell separator and a method of manufacturing a fuel cell separator for which efficiency of a manufacturing process is improved and acid resistance is sufficiently achieved.

An exemplary embodiment of the present, invention provides a fuel cell separator (for example, a fuel cell separator 1 to be described above) included in a fuel cell, the fuel cell separator including: a substrate (for example, a substrate 11 to be described later) made of stainless steel; a middle portion (for example, a middle portion 30 to be described later) including a power generating portion; and an outer peripheral portion (for example, an outer peripheral portion 20 to be described later) including a non-power generating portion, in which the middle portion includes a dissimilar metal layer (for example, a dissimilar metal layer 12 to be described later) different from the stainless steel included in the substrate on the substrate, and a carbon layer (for example, a carbon layer 13 to be described later) provided on the dissimilar metal layer, and in which the outer peripheral portion includes a portion (for example, a portion 21 to be described later) including the dissimilar metal layer, the carbon layer, and a resin layer on the carbon layer, and a portion (for example, a portion 22 to be described later) not including the dissimilar metal layer or the carbon layer, and including the resin layer on the substrate.

With such a configuration, it becomes possible to form the resin layer so as to continuously cover the outer peripheral portion, and thus it becomes possible to prevent the substrate and the dissimilar metal layer from being exposed to a strongly acidic atmosphere in the outer peripheral portion exposed to the strongly acidic atmosphere. In particular, since the portion of the outer peripheral portion of the substrate on which a film containing acid-resistant Cr is not formed is covered by the resin layer, it is possible to prevent the substrate from being exposed to a strongly acidic atmosphere. As a result, it is possible to provide the fuel cell separator having sufficient acid resistance.

In addition, since the outer peripheral portion includes the portion including the resin layer, it is possible to support the portion by a jig, or it is possible to provide the fuel cell separator in which the dissimilar metal layer and the carbon layer are formed simultaneously on the front and back surfaces of the other portions of the substrate in the state of the portion being supported in this manner. As a result, it is possible to provide the fuel cell separator in which efficiency of the manufacturing process of the fuel cell separator is improved.

In this case, it is preferable that the dissimilar metal layer include at least one of Cr, Ti, and Nb. Thus, it becomes possible to reduce or prevent the substrate from being eluted.

Furthermore, an exemplary embodiment of the present application provides a method of manufacturing a fuel cell separator (for example, a fuel cell separator 1 to be described above) Included in a fuel cell, the method including the steps of: forming a dissimilar metal layer (for example, a dissimilar metal layer 12 to be described later) different from stainless steel constituting a substrate (for example, a substrate 11 to be described later), on front and back surfaces of the substrate while supporting an outer peripheral portion (for example, an outer peripheral portion 20 to be described later) of the substrate made of stainless steel, and forming a carbon layer (for example, a carbon layer 13 to be described later) on the dissimilar metal layer on the front and back surfaces of the substrate while supporting the outer peripheral portion of the substrate, and forming a resin layer (for example, a resin layer 14 to be described later) on the outer peripheral portion of the substrate, and further forming, on the outer peripheral portion of the substrate, a portion (for example, a portion 21 to be described later) including the dissimilar metal layer, the carbon layer, and the resin layer, and a portion (for example, a portion 22 to be described later) which does not include the dissimilar metal layer or the carbon layer, and includes the resin layer.

Thus, it is possible to form the carbon layer on the dissimilar metal layer simultaneously on the front and back surfaces of the substrate made of a stainless steel plate, such that it is possible to provide the fuel cell separator for which efficiency of the manufacturing process of the fuel cell separator is improved.

Furthermore/the manufacturing process further includes the step of forming the resin layer on the outer peripheral portion of the substrate/and further forming the portion including the dissimilar metal layer, the carbon layer, and the resin layer, and the portions which do not include the dissimilar metal layer or the carbon layer, and each include the resin layer, on the outer peripheral portion of the substrate. As a result, when the dissimilar metal layer and the carbon layer are formed in the outer peripheral portion of the substrate, the portion (for example, a portion 22 described later) where the dissimilar metal layer and the carbon layer are not provided due to supporting the substrate is covered with the resin layer, it is possible to prevent the substrate from being exposed to a strong acid atmosphere. As a result, it is possible to provide the fuel cell separator having sufficient acid resistance.

According to an exemplary embodiment of the present invention, it is possible to provide a fuel cell separator and a method of manufacturing a fuel cell separator for which efficiency of the manufacturing process is improved and acid resistance is sufficiently achieved.

DETAILED DESCRIPTION OF THE INVENTION

Figure 1:
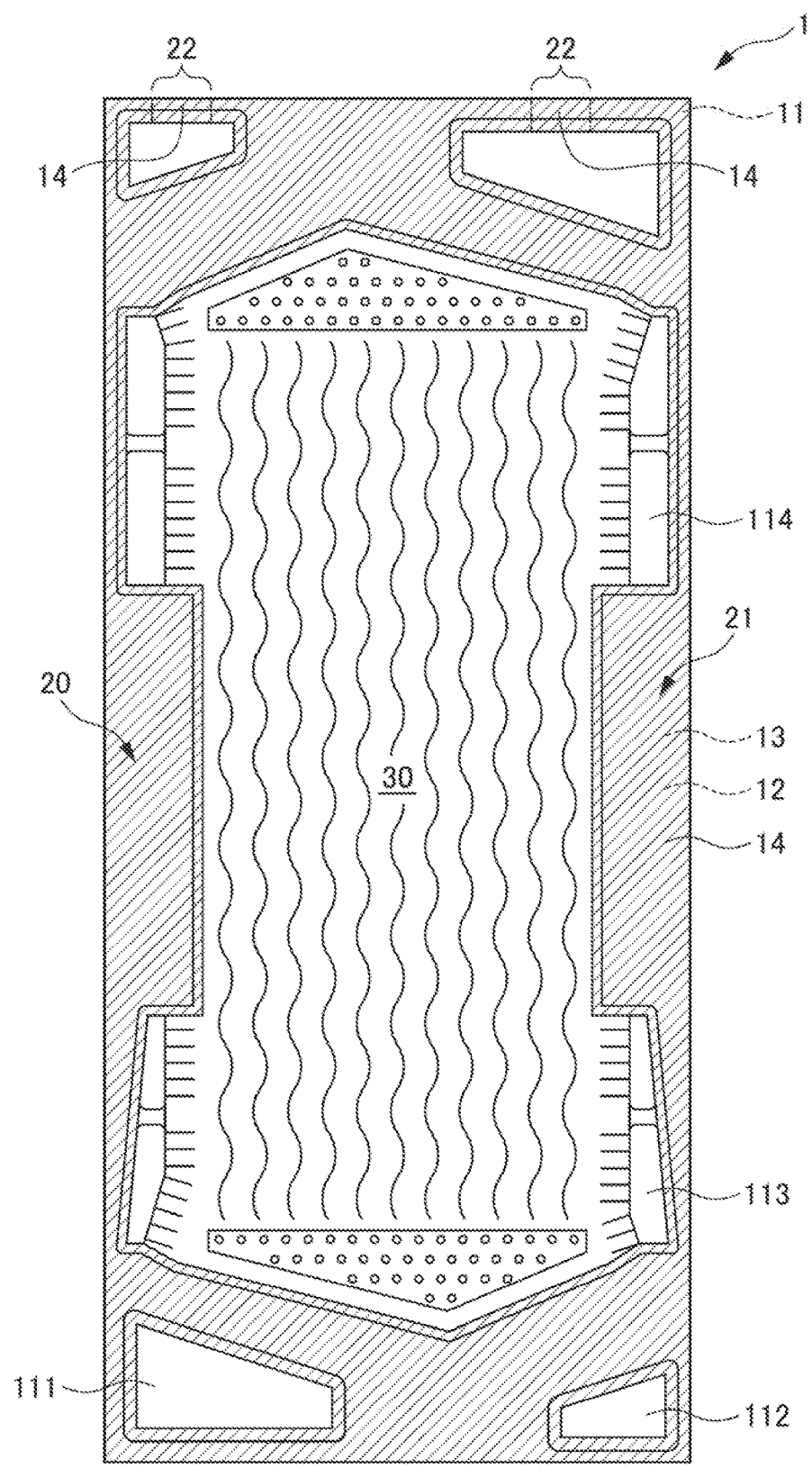
FIG. 1 is a plan view showing a fuel cell separator according to an exemplary embodiment of the present invention.

Hereinafter, an exemplary embodiment of the present invention will be described in detail with reference to the drawings. FIG. 1 is a plan view showing a fuel ceil separator 1.

A fuel cell including a fuel cell separator 1 includes an electrolyte membrane and electrode structure, and a fuel cell separator 1 on a cathode side and a fuel cell separator 1 on an anode side sandwiching the electrolyte membrane and electrode structure. A plurality of fuel cells are stacked to constitute a fuel cell stack. Hereinafter, for convenience of explanation, the fuel cell separator 1 on the cathode side and the fuel cell separator 1 on the anode side will be described as a fuel cell separator 1 without particularly distinguishing them.

The fuel cell separator 1 includes a substrate 11 made of a rectangular or substantially rectangular stainless steel (SUS) steel plate, a dissimilar metal layer 12 different from the stainless steel included in the substrate 11, a carbon layer 13, and a resin layer 14. The substrate 11 has a rectangular outer shape in plan view. A middle portion 30 of the substrate 11 is pressed into a corrugated shape to form an uneven surface. Furthermore, an outer peripheral portion 20 of the substrate 11 includes a plurality of through holes 111, 112, 113, and 114 serving as, for example, an oxidant gas inlet communication hole that supplies an oxygen-containing gas, and a fuel gas outlet communication hole that discharges a fuel gas such as a hydrogen-containing gas. The middle portion 30 includes a power generating portion opposed to the electrode of the electrolyte membrane and electrode structure in the fuel cell. The outer peripheral portion 20 is not opposed to the electrode of the electrolyte membrane and electrode structure in the fuel cell, and constitutes a non-power generating portion that does not generate power.

The middle portion 30 includes the dissimilar metal layer 12 formed on the substrate 11, and the carbon layer 13 formed on the dissimilar metal layer 12. The outer, peripheral portion 20 includes a portion 21 and portions 22. The portion 21 includes the dissimilar metal layer 12 formed on the substrate 11, the carbon layer 13 formed on the dissimilar metal layer 12, and the resin layer 14 formed on the carbon layer 13. The portions 22 do not include the dissimilar metal layer 12 or the carbon layer 13, and each include the resin layer 14 formed on the substrate 11.

The dissimilar metal layer 12 of the middle portion 30 and the outer peripheral portion 20 includes a layer of an acid-resistant film. The layer of the acid-resistant film is formed on the front and back surfaces of the substrate 11 and contains at least one of Cr, Ti, and Nb. In the exemplary embodiment, the dissimilar metal layer 12 includes a layer of an acid-resistant film containing Cr. The carbon layer 13 of the middle portion 30 and the outer peripheral portion 20 includes a layer of a carbon film. The layer of the carbon film is formed by laminating on the dissimilar metal layer 12 formed on the front and back surfaces of the substrate 11.

The resin layer 14 of the portion 21 of the outer peripheral portion 20 includes a layer of resin. The layer of resin is formed by laminating on the carbon layer 13 formed on the front and back surfaces of the substrate 11. Furthermore, the resin layer 14 of the portion 22 of the outer peripheral portion 20 includes a layer containing a resin provided on the front surface portion and the back surface portion of the substrate 11 on which the dissimilar metal layer 12 or the carbon layer 13 are not provided. It should be noted that, in the present application, "resin" indicates a resin in a broad sense, and encompasses rubber, for example. The resin layer 14 of the portion 21 of the outer peripheral portion 20 and the resin layer 14 of the portion 22 of the outer peripheral portion 20 continuously cover so as to coat the outer peripheral portion 20, and thus seal the outer peripheral portion 20 so that an oxygen-containing gas, a hydrogen-containing gas, and other gases do not leak out. In other words, the resin layer 14 which continuously coats the outer peripheral portion 20 coats, at the portion 21 of the outer peripheral portion 20, the carbon layer 13 formed on the dissimilar metal layer 12 formed on the substrate 11, and coats, at the portion 22 of the outer peripheral portion 20, the substrate 11 on which the dissimilar metal layer 12 and the carbon layer 13 are not formed. Therefore, at the outer peripheral portion 20, the substrate 11, the dissimilar metal layer 12, and the carbon layer 13 are coated with the resin layer 14.

The fuel cell separator 1 includes the portions 22 of the outer peripheral portion 20 at a portion of one side of a pair of short sides of the pair of rectangular fuel cell separators 1. More specifically, the portions 22 of the outer peripheral portion 20 are each located at the middle portion in the left-right direction of the peripheral portion of the through hole serving as the oxidant gas inlet communication hole that supplies an oxygen-containing gas in the substrate 11, the fuel gas outlet communication hole that discharges a fuel gas such as a hydrogen-containing gas, or other gases. The substrate 11 is supported by each of the jigs 9 at the respective locations as described later such that the substrate 11 can be supported stably. The portion 22 of the outer peripheral portion 20 is a portion at which the jig 9 as described later (refer to FIG. 2) supporting the substrate 11 is in contact, with the substrate 11 during the formation of the dissimilar metal layer 12 and the carbon layer 13 by the PVD coating simultaneously on the front and back surfaces of the substrate 11. The portion 22 of the outer peripheral portion 20 has substantially the same shape as the portion of the jig 9 in contact with the substrate 11.

Figure 2:
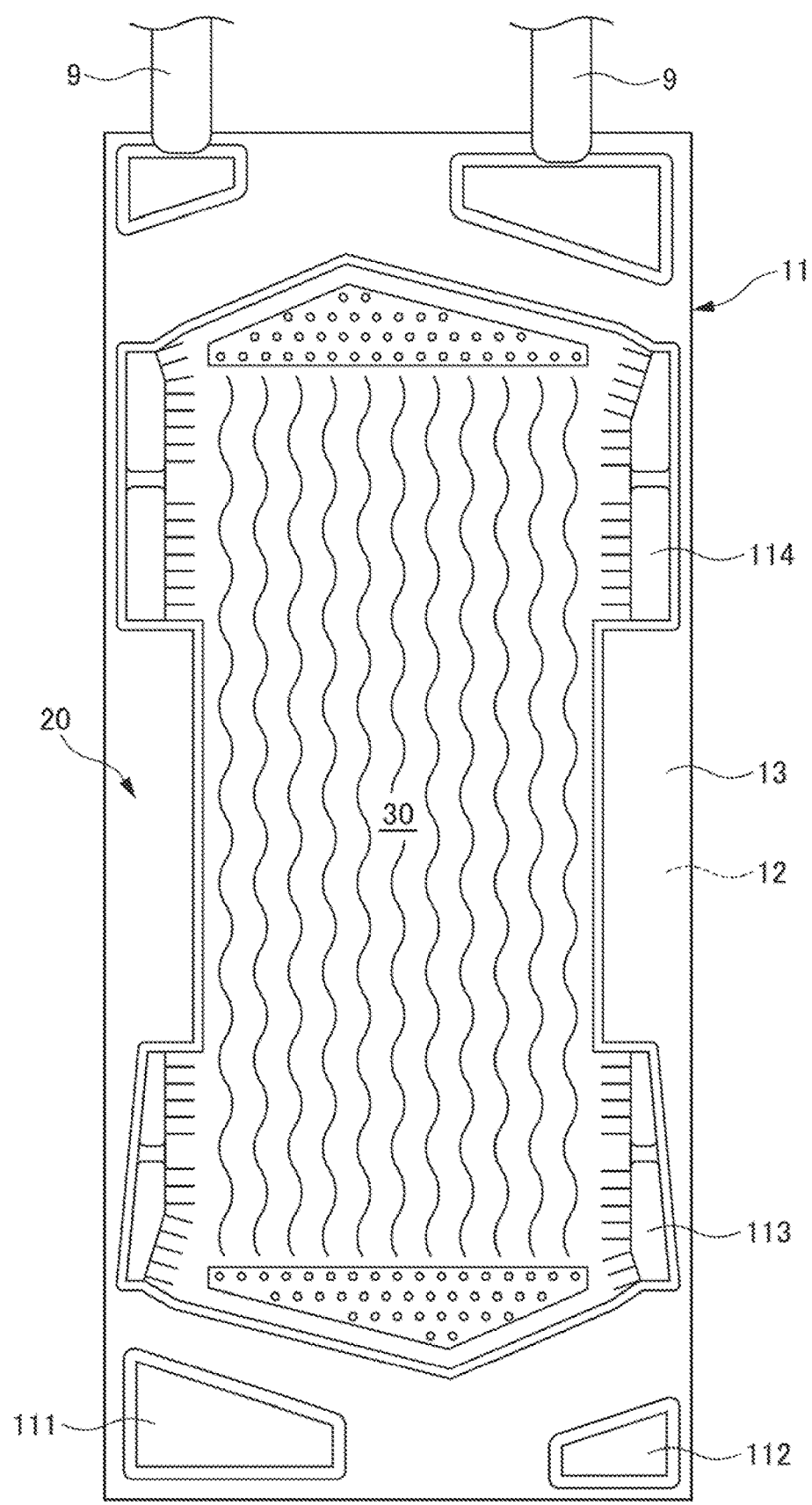
FIG. 2 is a plan view showing a state of a substrate of a fuel ceil separator in a state after a carbon layer is formed and before a resin layer is formed in a method of manufacturing a fuel cell separator according to an exemplary embodiment of the present invention.

Next, a method of manufacturing a fuel cell separator for manufacturing the fuel cell separator 1 will be described. FIG. 2 is a plan view showing a state of the substrate 11 of the fuel cell separator 1 after the carbon layer 13 is formed and before the resin layer 14 is formed in the method of manufacturing the fuel cell separator.

In the method of manufacturing the fuel cell separator, the PVD coating is performed to manufacture the fuel cell separator 1. More specifically, first, the substrate 11 coated with a primer on the outer peripheral portion 20 of the front and back surfaces is supported by being held by the jigs 9. The portion of the substrate 11 to be held by each of the jigs 9 corresponds to the portion 22 of the outer peripheral portion 20, as shown in FIGS. 1 and 2.

Next, the substrate 11 is put in a processing furnace in a state being held by the jig 9, is sealed, and subjected to vacuum evacuation until a predetermined pressure is reached. Hereafter, the state in which the substrate 11 is supported by being held by the jig 9 is maintained until the substrate 11 is taken out from the processing furnace. Next, the temperature in the processing furnace is raised to sufficiently heat the substrate 11. Thus, impurities such as moisture adhering to the surface of the substrate 11 are evaporated. Next, argon ions are collided with the surface of the substrate 11 to remove impurities such as an oxide film.

Then, by performing an arc discharge between the metal material including the dissimilar metal layer 12 and the processing furnace, the metal material is vaporized and ionized as a plasma state. Then, by applying a negative voltage to the substrate 11, the ionized metal material is caused to collide with the substrate 11 at high speed to simultaneously form the dissimilar metal layer 12 on the front and rear surfaces of the substrate 11.

Next, arc discharge is performed between a carbon material constituting the carbon layer 13 and the processing furnace, such that, the carbon material is vaporized and ionized as a plasma state. Then, a negative voltage is applied to the substrate 11 to cause the ionized carbon material to collide with the substrate 11 at high speed, thereby simultaneously forming the carbon layer 13 on the dissimilar metal layer 12 formed on the front and back surfaces of the substrate 11. After, the carbon layer 13 is formed, nitrogen or helium is injected into the processing furnace to cool the substrate 11 on which the dissimilar metal layer 12 and the carbon layer 13 are formed.

Next, the substrate 11 on which the dissimilar metal layer 12 and the carbon layer 13 are formed is taken out of the processing furnace and removed from the jigs 9. Then, the substrate 11 is set in a cavity of a mold for injection molding, injection molding is performed using a molten resin, and the resin is molded on the outer peripheral portion 20 of the substrate 11 so as to cover the outer peripheral portion 20 of the substrate 11. At this time, at the portion 21 of the outer peripheral portion 20, the resin layer 14 is formed so as to cover the dissimilar metal layer 12 and the carbon layer 13 formed on the substrate 11, and at the portion 22 of the outer peripheral portion 20, the resin layer 14 is formed so as to cover the portion of the substrate 11 where the dissimilar metal layer 12 and the carbon layer 13 are not formed due to the contact of the jig 9 with the substrate 11. Then, by curing the resin of the outer peripheral portion 20, the fuel cell separator 1 is manufactured.

According to the exemplary embodiment, the following advantageous effects are achieved. In the exemplary embodiment, the outer peripheral portion 20 includes the portion Including the dissimilar metal layer 12, the carbon layer 13, and the resin layer 14, and the portions each of which does not include the dissimilar metal layer 12 or the carbon layer 13, and includes the resin layer 14.

With such a configuration, it becomes possible to form the resin layer 14 so as to continuously cover the outer peripheral portion 20, and thus it becomes possible to prevent the substrate 11 and the dissimilar metal layer 12 from being exposed to a strongly acidic atmosphere in the outer peripheral portion 20 exposed to the strongly acidic atmosphere. In particular, since a film containing acid-resistant Cr is not formed on the portion 22 of the outer peripheral portion 20, but the portion 22 of the outer peripheral portion 20 of the substrate 11 is covered by the resin layer 14, it is possible to prevent the substrate 11 from being exposed to a strongly acidic atmosphere. As a result, it is possible to provide the fuel cell separator 1 having sufficient acid resistance.

In addition, since the outer peripheral portion 20 includes the portion including the resin layer 14, it is possible to support the portion by the jig 9, or it is possible to provide the fuel cell separator 1 in which the dissimilar metal layer 12 and the carbon layer 13 are formed simultaneously on the front and back surfaces of the other portions of the substrate 11 in the state of the portion being supported in this manner. As a result, it is possible to provide the fuel cell separator 1 in which efficiency of the manufacturing process of the fuel cell separator 1 is improved.

Furthermore, in the exemplary embodiment, the dissimilar metal layer 12 includes at least one of Cr, Ti, and Nb. Thus, it is possible to reduce or prevent iron from being eluted from the substrate 11, which is a stainless steel plate.

Furthermore, in the exemplary embodiment, the manufacturing process includes a step of forming the dissimilar metal layer 12 different from the stainless steel included in the substrate 11 on the front and back surfaces of the substrate 11, while supporting the outer peripheral portion 20 of the substrate 11 made of stainless steel, and a step of forming the carbon layer 13 on the dissimilar metal layer 12 on the front and back surfaces of the substrate 11 while supporting the outer peripheral portion 20 of the substrate 11.

Thus, it is possible to form the carbon layer 13 on the dissimilar metal layer 12 simultaneously on the front and back surfaces of the substrate 11 made of a stainless steel plate, such that it is possible to provide the fuel cell separator 1 for which efficiency of the manufacturing process of the fuel cell separator 1 is improved.

Furthermore, the manufacturing process further includes a step of forming the resin layer 14 on the outer peripheral portion 20 of the substrate 11, and further forming the portion including the dissimilar metal layer 12, the carbon layer 13, and the resin layer 14, and the portions which do not include the dissimilar metal layer 12 or the carbon layer 13, and each include the resin layer 14, on the outer peripheral portion 20 of the substrate 11.

As a result, when the dissimilar metal layer 12 and the carbon layer 13 are formed in the outer peripheral portion 20 of the substrate 11, since the portion 22 where the dissimilar metal layer 12 and the carbon layer 13 are not provided due to the jigs 9 supporting the substrate 11 is covered with the resin layer 14, it is possible to prevent the substrate 11 from being exposed to a strong acid atmosphere. As a result, it is possible to provide the fuel cell separator 1 having sufficient acid resistance.

It should be noted that the present invention is not limited to the above embodiment, and modifications, improvements, and the Like within a scope which can achieve the object of the present invention are included in the present invention. For example, the configurations in relation to a substrate, a dissimilar metal layer, a carbon layer, a resin layer, a jig, and other components are not limited to the configurations in relation to the substrate 11, the dissimilar metal layer 12, the carbon layer 13, the resin layer 14, the jigs 9 and other components according to the exemplary embodiment. Furthermore, for example, the resin layer 14 continuously coats the outer peripheral portion 20, and at the portion 21 of the outer peripheral portion 20, further coats the carbon layer 13 formed on the dissimilar metal layer 12 further formed on the substrate 11. However, the present invention is not limited to this configuration. As long as the resin layer 14 is continuously coated on the outermost peripheral portion of the substrate 11, there may be a portion which is not covered with the resin layer 14 partially on the portion where the dissimilar metal layer 12 is provided on the substrate 11, at the outer peripheral portion located inside the outermost peripheral portion.

EXPLANATION OF REFERENCE NUMERALS

1 fuel cell separator
11 substrate
12 dissimilar metal layer
13 carbon layer
20 outer peripheral portion
21, 22 portion
30 middle portion

What is claimed is:

1. A fuel cell separator included in a fuel cell, the fuel cell separator comprising:
    a substrate made of stainless steel, which the substrate is rectangular, and includes first and second short sides, and a pair of long sides;
    a middle portion including a power generating portion; and
    an outer peripheral portion including a non-power generating portion, which the outer peripheral portion includes a plurality of through holes;
    wherein the middle portion includes a dissimilar metal layer different from the stainless steel included in the substrate on the substrate, and a carbon layer provided on the dissimilar metal layer, and
    wherein the outer peripheral portion includes a first portion including the dissimilar metal layer, the carbon layer, and a resin layer on the carbon layer, and second and third portions not including the dissimilar metal layer or the carbon layer, and including the resin layer on the substrate, and the second and third portions are disposed on the first short side of the substrate; and
    the resin layer formed on the second and third portions directly contacts the substrate, and is free of any layers formed thereon.

2. The fuel cell separator according to claim 1, wherein the dissimilar metal layer contains at least one of Cr, Ti, and Nb.

3. A method of manufacturing a fuel cell separator included in a fuel cell, the method comprising the steps of:
    forming a dissimilar metal layer different from stainless steel constituting a substrate, on front and back surfaces of the substrate while supporting an outer peripheral portion of the substrate made of stainless steel, and
    forming a carbon layer on the dissimilar metal layer on the front and back surfaces of the substrate while supporting the outer peripheral portion of the substrate, and
    forming a resin layer on the outer peripheral portion of the substrate, and further forming, on the outer peripheral portion of the substrate, a first portion including the dissimilar metal layer, the carbon layer, and the resin layer, and second and third portions which do not include the dissimilar metal layer or the carbon layer, and includes the resin layer, and wherein
    the substrate is rectangular, and includes first and second short sides, and a pair of long sides;
    the outer peripheral portion includes a plurality of through holes;
    the second and third portions are dis used on the first short side of the substrate; and
    the resin layer formed on the second and third portions directly contacts the substrate, and is free of any layers formed thereon.

4. The fuel cell separator according to claim 1, wherein:
    the through holes comprise a pair of oxidant gas inlet communication holes;
    each of the second and third portions of the outer peripheral portion is located at a periphery of one of the oxidant gas inlet communication holes.

5. The fuel cell separator according to claim 4, wherein each of the second and third portions of the outer peripheral portion extends to an outer edge of the first short side of the substrate.

* * * * *